(12) United States Patent
Wyville (10) Patent No.: US 8,520,968 B1
(45) Date of Patent: Aug. 27, 2013

(54) COMMUNICATION SIGNAL IMAGE SUPPRESSION FOR MULTI-FREQUENCY OPERATION

(75) Inventor: Mark William Wyville, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 63 days.

(21) Appl. No.: 13/403,718

(22) Filed: Feb. 23, 2012

(51) Int. Cl.
G06K 9/40 (2006.01)

(52) U.S. Cl.
USPC .......... 382/260; 382/191; 382/207; 382/208; 382/261; 382/300

(58) Field of Classification Search
USPC .............. 382/191, 207–208, 260–261, 300
See application file for complete search history.

(56) References Cited

U.S. PATENT DOCUMENTS

| 5,289,127 | A * | 2/1994 | Doddrell et al. ............ 324/314 |
| 5,945,885 | A * | 8/1999 | Schwartz et al. ........... 332/100 |
| 6,600,438 | B2 * | 7/2003 | Hilton ........................... 341/155 |
| 6,973,141 | B1 * | 12/2005 | Isaksen et al. ................ 375/308 |
| 7,107,022 | B1 | 9/2006 | Thomas et al. |
| 7,382,257 | B2 * | 6/2008 | Thomas et al. ............ 340/572.1 |
| 7,528,754 | B1 * | 5/2009 | Bakkaloglu et al. ......... 341/143 |
| 7,714,760 | B2 * | 5/2010 | Petrovic ....................... 341/155 |
| 7,924,802 | B2 * | 4/2011 | Tarighat-Mehrabani et al. ............................. 370/343 |
| 8,089,854 | B2 * | 1/2012 | Persico ........................ 370/204 |
| 8,237,595 | B2 * | 8/2012 | Petrovic ....................... 341/144 |
| 2004/0028151 | A1 * | 2/2004 | Arambepola et al. ........ 375/316 |
| 2004/0264600 | A1 * | 12/2004 | Kao et al. ..................... 375/316 |
| 2007/0263673 | A1 * | 11/2007 | Agazzi et al. ................ 370/516 |
| 2009/0225903 | A1 * | 9/2009 | van Waasen .................. 375/316 |
| 2009/0322578 | A1 * | 12/2009 | Petrovic ....................... 341/155 |
| 2011/0075780 | A1 * | 3/2011 | Petrovic ....................... 375/355 |

\* cited by examiner

Primary Examiner — Jayesh A Patel
(74) Attorney, Agent, or Firm — Christopher & Weisberg, P.A.

(57) ABSTRACT

A method and system for image suppression and digital-to-analog conversion (DAC) of a radio frequency (RF) signal is disclosed. In one embodiment, a digital input signal having undesired image spectra is input to two paths. In one path, the digital input signal is phase shifted so that an output of each path are out of phase by substantially 180 degrees at a frequency of the undesired image spectra, so that the undesired image spectra are substantially suppressed.

20 Claims, 5 Drawing Sheets

COMMUNICATION SIGNAL IMAGE SUPPRESSION FOR MULTI-FREQUENCY OPERATION

TECHNICAL FIELD

The present invention relates to wireless communications, and in particular to a system and method for suppressing image spectra in a digital signal and converting the digital signal to an analog signal.

BACKGROUND

Digital processors are used in modern communication devices to perform complex processing while adhering to reasonable power and size constraints. In order to transfer information to another radio, digital signals containing the information are first converted to analog signals for transmission. This conversion process is performed by a digital-to-analog converter (DAC).

The frequency representation of a digital signal consists of an infinite number of replicas of the equivalent baseband analog signal. The replicas, also referred to as image spectra, are separated in the frequency domain by $f_s$, which is the frequency of the digital sampling clock. All but one replica must be suppressed at the output of a digital-to-analog converter (DAC). Otherwise, due to the close frequency spacing of the replicas, non-linear action in an up-conversion mixer or power amplifier will result in inter-modulation distortion in the pass band.

Figure 1:
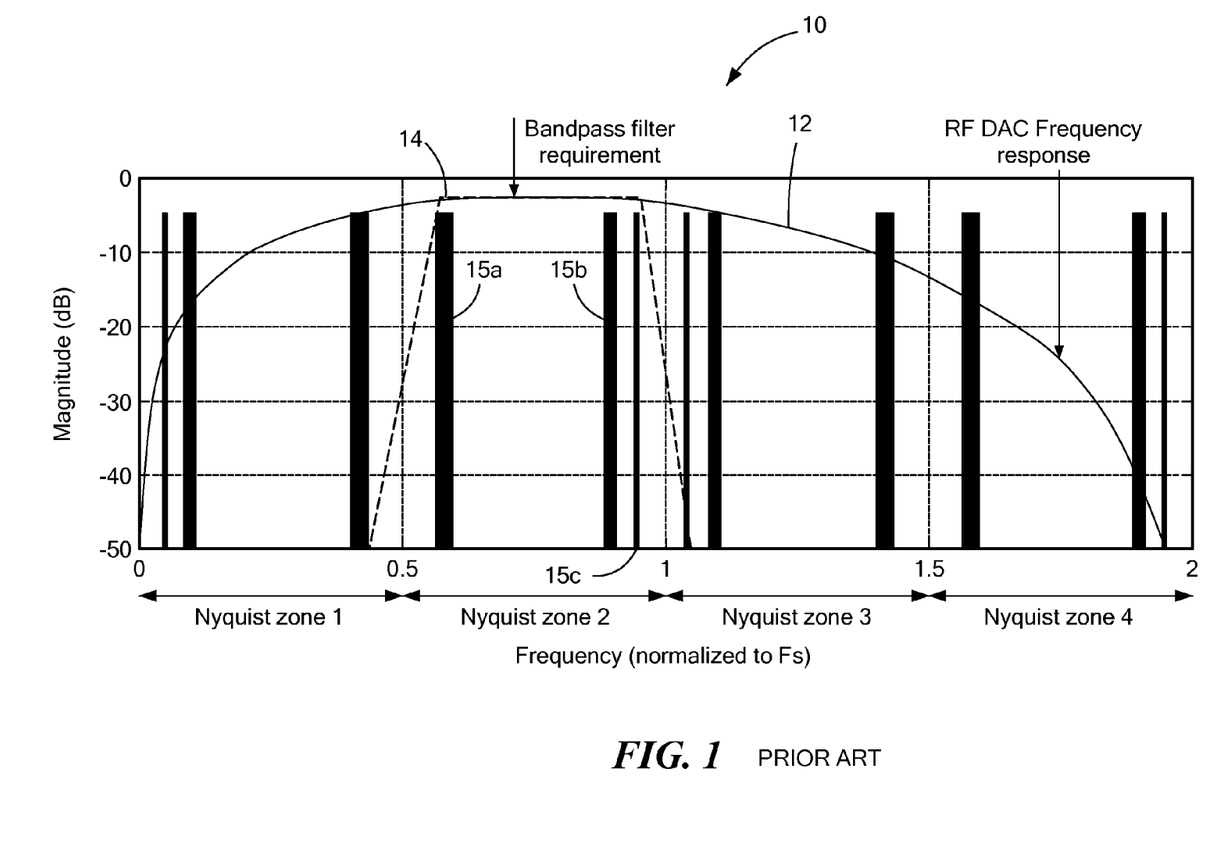
FIG. 1 is a frequency spectrum diagram of over-sampled digital signals.

FIG. 1 shows the frequency (image) spectrum 10 of three over-sampled digital signals 15a, 15b and 15c. Each of the three signals has been up-converted in the digital domain by a different frequency. In a conventional DAC, the desired images lie in the first Nyquist zone. In a radio frequency (RF) DAC, the desired images are in a different Nyquist zones, such as the $2^{nd}$ Nyquist zone as indicated in FIG. 1. Two design challenges are presented by RF DACs. First, the desired images must not be significantly attenuated by a sample-and-hold (S&H) frequency response of the DAC. Second, the undesired images must be filtered out before the signal is sent to a power amplifier.

The first design challenge may be met with a S&H frequency response that contains a large magnitude near the sampling frequency (frequency=1 in FIG. 1.) Commercially available RF DACs can achieve this goal. For example, the curve 12 is a representative RF DAC frequency response that is nearly constant over the second Nyquist zone.

The second design challenge is met using analog bandpass filtering. A bandpass filtering requirement is shown by the dashed line 14 in FIG. 1. Note that the selectivity demands of the bandpass filter are high when desired image spectra are close to the edge of a Nyquist zone. As the selectivity demands of the analog bandpass filter increase, the filter order increases, and the passband phase distortion increases. This problem is exacerbated when very wideband signals or multi-frequency signals with wide frequency separations are to be transmitted, and the resulting extremely difficult filtering requirements require multiple cascaded filter designs.

Therefore, there is a need for suppressing image spectra of a desired frequency response so that a relatively low order bandpass filter may be used to select the desired frequency response.

SUMMARY

The present invention advantageously provides a method and system for suppressing image spectra of a digital signal and for converting the digital signal to an analog signal. According to one aspect, the invention provides a device with a first signal path and a second signal path electrically in parallel with the first signal path. The first signal path has a filter, a first digital-to-analog converter (DAC), an analog phase shifter and a first signal path output. The second signal path has a coarse delay compensation device that delays the digital signal to compensate for a group delay response of the filter. The second signal path also has a second DAC and a second signal path output. The device also has a combiner that combines the first signal path output and the second signal path output. The combined signal has replicas of the image spectra that are at least partially suppressed.

According to another aspect, the invention provides a method for suppressing images in the spectrum of a digital signal and converting the digital signal to an analog signal. The method includes, in a first signal path, filtering the digital signal by a filter, converting the filtered digital signal to produce a first analog signal, phase shifting the first analog signal and outputting the phase-shifted analog signal to produce a first signal path output. The method also includes, in a second signal path, delaying the digital signal by a coarse delay device, converting the delayed digital signal to produce a second analog signal and outputting the second analog signal to produce a second signal path output. The method also includes combining the first signal path output and the second signal path output to produce a combined output signal that has out-of-band image spectra substantially suppressed.

According to yet another aspect, the invention provides a system for suppression of image spectra and for conversion of multiple digital signals to an analog signal. The system includes, for each one of a plurality of digital input signals, a first signal path and a second signal path. The first signal path has a complex filter, a first quadrature modulator and a first signal path output. The second signal path has a coarse delay device, a second quadrature modulator and a second signal path output. The system has a first adder to add the first signal path outputs to produce a first composite digital signal. A second adder functions to add the second signal path outputs to produce a second composite digital signal. A first DAC converts the first composite digital signal to a first analog signal. A second DAC converts the second composite digital signal to a second analog signal. An analog phase shifter communicatively coupled to the second DAC, phase-shifts the second analog signal to produce a phase-shifted second analog signal. A third adder combines the first analog signal and the phase-shifted second analog signal to produce an output signal having suppressed image spectra.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside primarily in combinations of apparatus components and processing steps related to image suppression in a radio frequency (RF) signal of a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, analog outputs from two paths are combined in a manner that attenuates a replica of the image spectra of a signal in one of the Nyquist zones. Prior to combining the analog outputs from two paths, at least one of the paths does not exhibit both an anti-symmetric phase response and a symmetric magnitude response about the multiple of the digital clock frequency that borders the Nyquist zone containing the replica to be attenuated. If the undesirable replica is located at $Nf_s+f_{IF}$ or $Nf_s-f_{IF}$, where $f_{IF}$ is an intermediate frequency, then the frequency to which the symmetry conditions refer is $Nf_s$.

Figure 2:
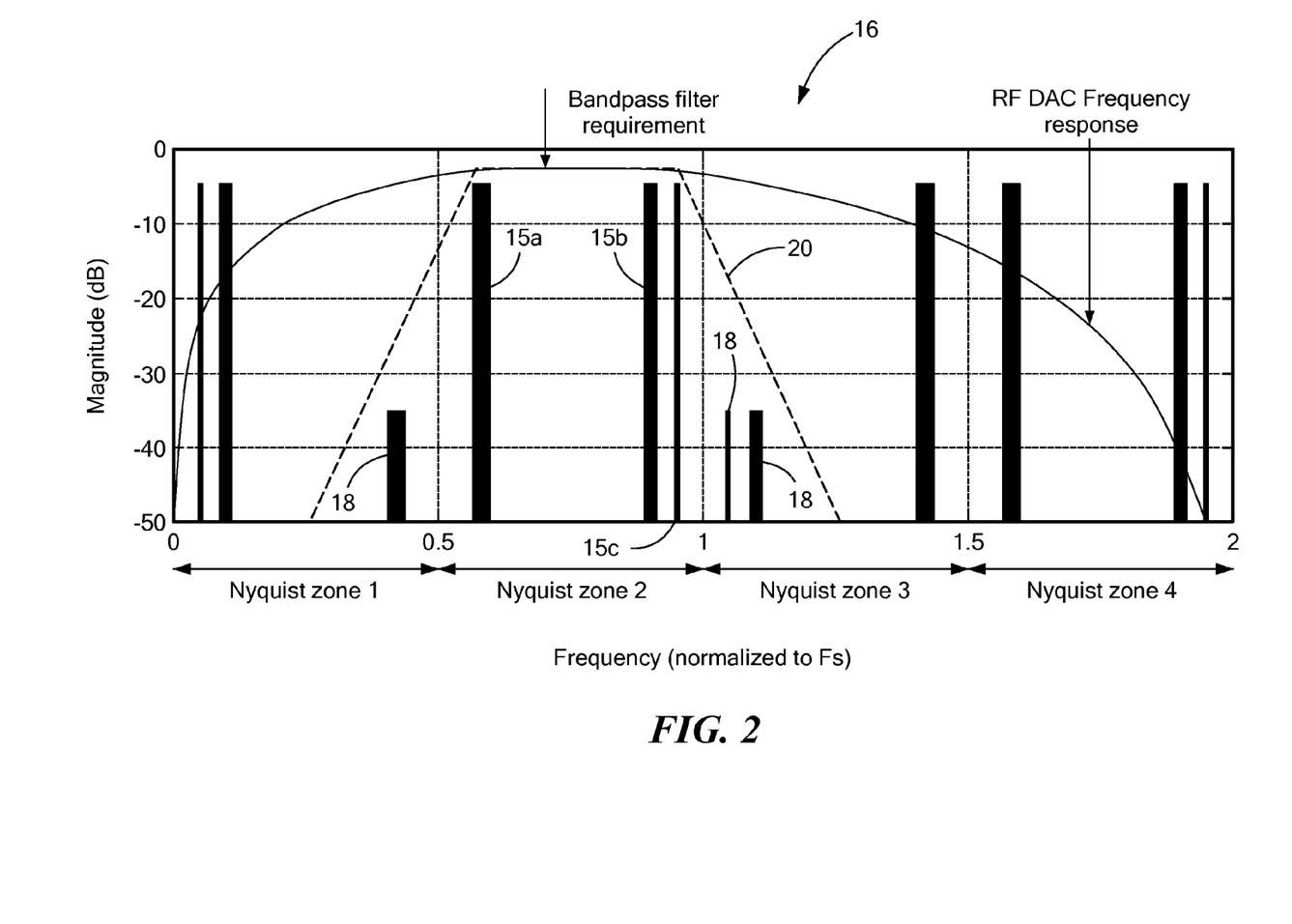
FIG. 2 is frequency spectrum illustrating suppressed image spectra and a relaxed filter selectivity requirement.

Referring now to the drawing figures, in which like reference designators denote like elements, there is shown in FIG. 2 a frequency spectrum illustrating substantial suppression of image spectra 18 of the three signals 15a, 15b and 15c, and a relaxed bandpass filter selectivity requirement 20. FIG. 2 shows that the image spectra in the Nyquist zones adjacent to the Nyquist zone having the desired spectra are suppressed. When the adjacent image spectra are substantially suppressed, as shown in FIG. 2, Nyquist zones 1 and 3, the selectivity of a bandpass filter can be relaxed, resulting in a bandpass filter of lower order which is less complex and easier to implement. Although the desired spectra is shown in the second Nyquist zone in FIG. 2, the spectra in another Nyquist zone could be chosen as the desired spectra instead, in which the image spectra in adjacent Nyquist zones are to be substantially suppressed.

Figure 3:
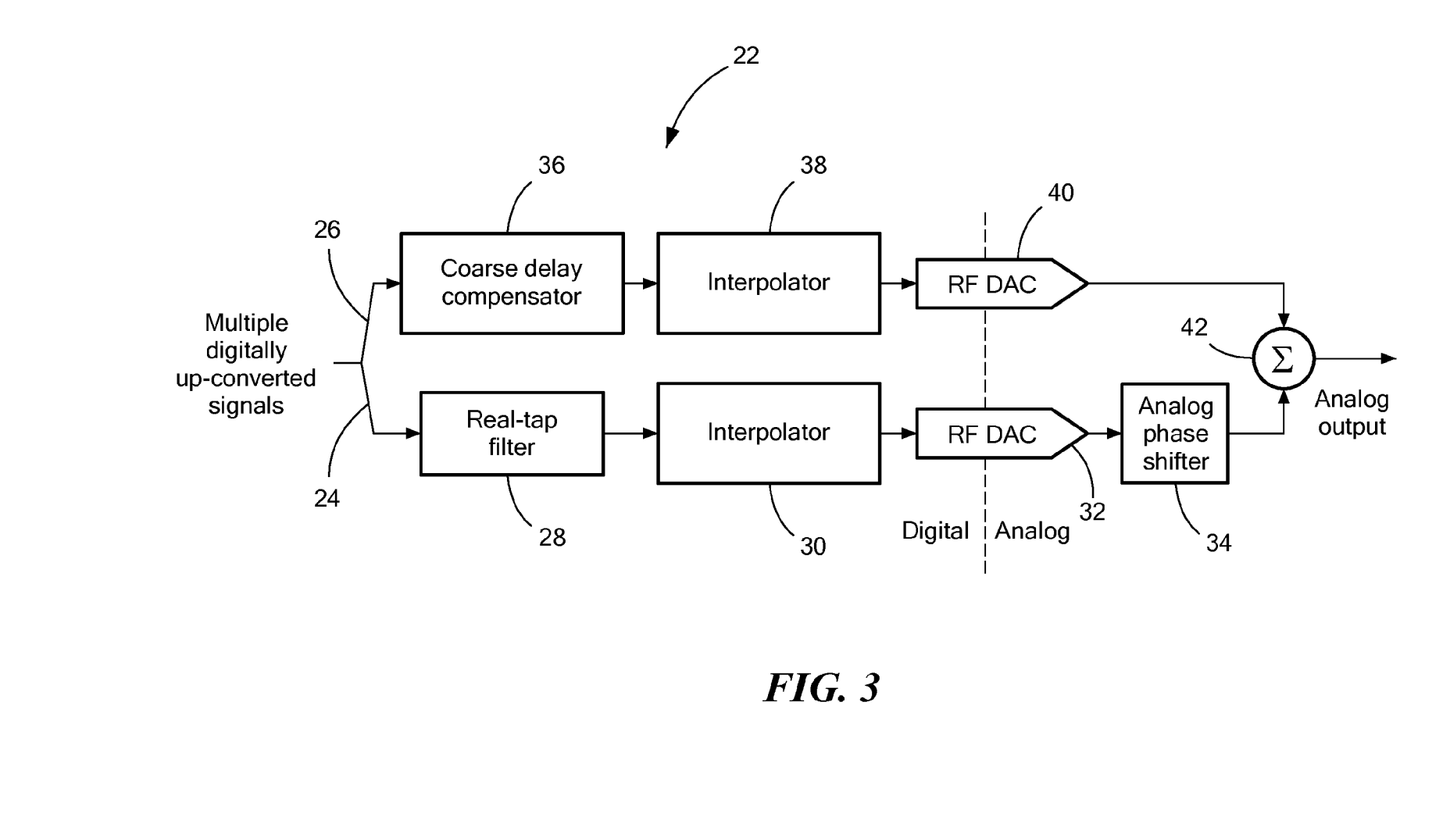
FIG. 3 is a block diagram of an exemplary image suppression circuit and DAC constructed in accordance with principles of the present invention.

FIG. 3 is a block diagram of an exemplary embodiment of an image suppression circuit and DAC apparatus 22 constructed in accordance with principles of the present invention. The apparatus of FIG. 3 receives one or more digital signals into a first signal path 24 and a second signal path 26. The one or more digital signals may include a plurality of signals tuned to different intermediate frequencies. The first and second signal paths are electrically in parallel.

The first signal path has a real tap filter 28, an optional interpolator 30, an RF DAC 32 and an analog phase shifter 34. The second signal path has a coarse delay compensator 36, an optional interpolator 38, and an RF DAC 40. The outputs of the first signal path 24 and the second signal path 26 are combined by an adder 42 to produce an analog output signal with replicas of the image spectra substantially suppressed, as shown in the Nyquist zones 1 and 3 of FIG. 2.

In the first path 24, the real tap filter 28 has an asymmetric phase response and a symmetric magnitude response which causes the images of a single frequency to produce a phase shift of $-\phi_i$ in odd numbered Nyquist zones and $+\phi_i$ in even numbered Nyquist zones. The subscript, i, denotes that the phase response of the filter is different for different frequencies. The value of $\phi_i$ is chosen to cause an undesired image spectra to be out of phase at the outputs of the two signal paths, 24 and 26. Thus, the total of the phase shift introduced by the real tap filter 28 and the analog phase shifter 34 is such that the output of the two paths 24 and 26 are 180 degrees out of phase in the frequency range of the undesired images to produce a signal where the undesired images are at least partially suppressed.

A specific desired phase response may have a non-causal impulse response so that the real tap filter 28 may need to be delayed or offset in the time domain. This delay is compensated in the second signal path by the coarse delay compensator 36, which delays the signal in the second signal path by an integer number of clock periods. Optional interpolators 30 and 38 may be introduced to up-sample the signals before being input into respective RF DACs 32 and 40. Up-sampling by the optional interpolators may be used to increase the spacing between replicas of the image spectra, provided that the design can afford an increased digital clock frequency.

Thus, in FIG. 3, a digital input signal—which may include a plurality of information signals from different frequency channels separated by various frequency spans—is input to a first path and to a second path. In the first path, the digital input signal is digitally filtered and converted to a first analog signal. In the second path, the digital input signal is delayed and converted to a second analog signal. The first analog signal is phase-shifted and combined with the second analog signal to produce an output signal having undesired image spectra at least partially suppressed.

Figure 4:
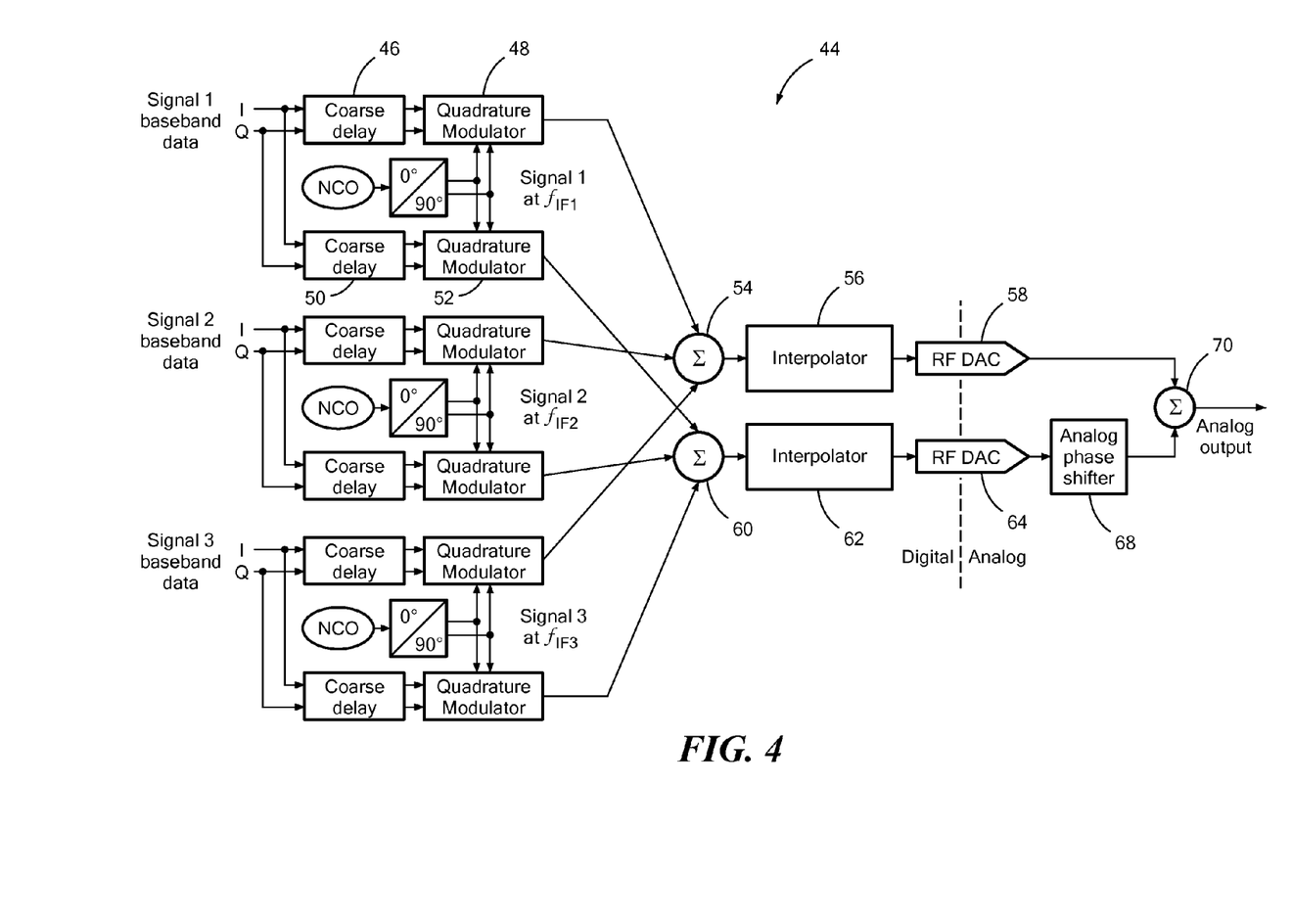
FIG. 4 is a block diagram of an exemplary image suppression circuit and DAC constructed in accordance with principles of the present invention.

FIG. 4 is a block diagram of another exemplary embodiment of an image suppression circuit and digital-to-analog converter apparatus 44 constructed in accordance with principles of the present invention. In FIG. 4, digital filtering is performed on each of a plurality of baseband signals before each signal is up-converted and combined with the other signals. In this embodiment each input signal has its own complex filter 46 and quadrature modulator 48 to process the input signal, and a coarse delay device 50 and quadrature modulator 52 to process the input signal.

The cascade combination of the complex filter 46 and quadrature modulator 48 provides a symmetric magnitude response and an asymmetric phase response. The coarse delay device 50 compensates for the delay introduced by the complex filter 46 by delaying the quadrature-phase signal by an integer number of clock cycles.

The digital input signals that are complex-filtered and quadrature modulated are combined by a first adder 54. The digital input signals that are coarse delayed and quadrature modulated are combined by a second adder 60. The outputs of the adders 54 and 60 are input to optional interpolators 56 and 62, respectively. The outputs of the optional interpolators 56 and 62 are input to RF DACs 58 and 64, respectively. The output of the RF DAC 64 is input to an analog phase shifter 68.

The combined phase shift of a complex filter 46 and the analog phase shifter 68 is such that the outputs of the RF DAC 58 and the analog phase shifter 68, when combined by an adder 70, have undesired images substantially suppressed. Thus, the output of the RF DAC 58 and the output of the analog phase shifter 68 are out of phase by about 180 degrees at a frequency of the undesired image spectra. By suppressing the undesired images which are closely spaced to the desired image, the selectivity of an analog bandpass filter to filter the output of the adder 70 can be relaxed as compared with prior filters.

Thus, in FIG. 4, each one of a plurality of digital input signals is input to a first signal path and is input to a second signal path. In the first path, the digital input signal is filtered by a complex filter and quadrature-modulated. In the second path, the digital input signal is delayed by a coarse delay device and quadrature-modulated.

The signals from each of the first signal paths are combined together and input to a first main path and the signals of the second signal paths are combined together and input to a second main path. The combined signals may optionally be interpolated. Then, the combined signals in each main path are separately converted to analog signals. The analog signal in the second main path is phase-shifted so that when the output signals of the first and second main paths are combined, the undesired images are substantially suppressed.

Comparing the embodiment of FIG. 3 with the embodiment of FIG. 4, the embodiment of FIG. 3 uses less digital resources for a large number of multi-frequency signals. Also, for the embodiment of FIG. 3, complexity does not significantly increase as the number of multi-frequency signals increases. In contrast to the real tap filter 28 of FIG. 3, each complex filter 46 of FIG. 4 may be of relatively simpler complexity so that choosing coefficients for the filters 46 may be simpler than choosing the coefficients of the real tap filter 28.

Figure 5:
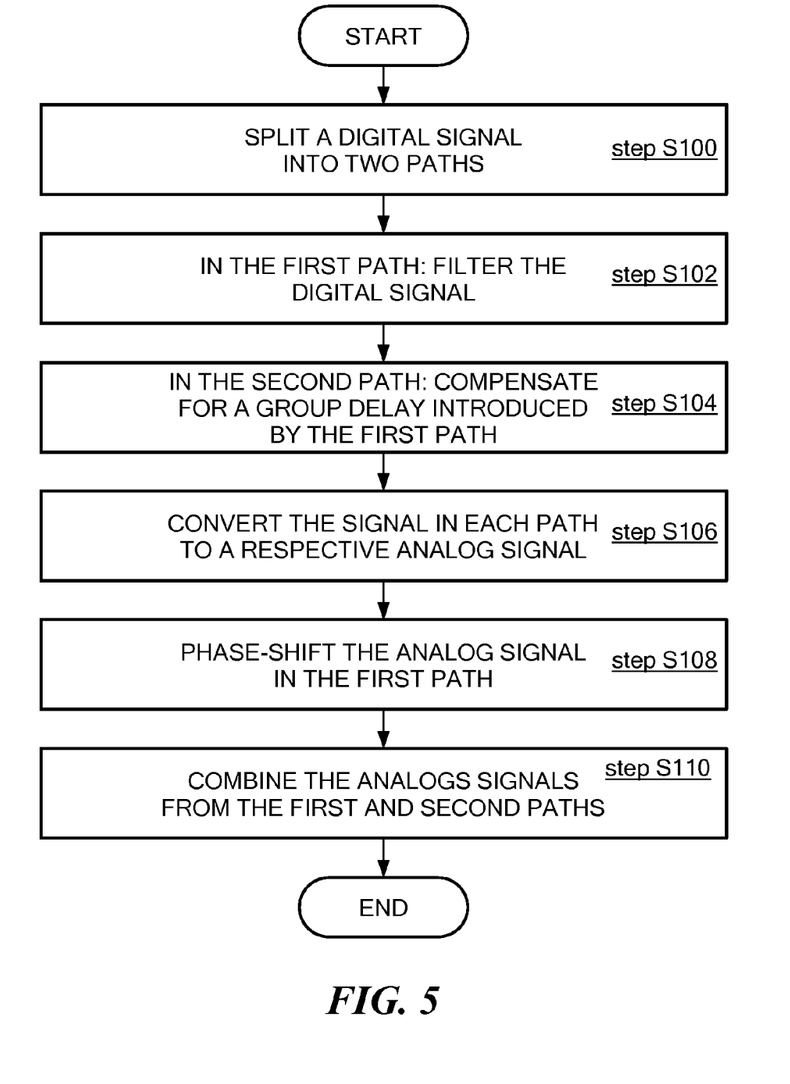
FIG. 5 is a flowchart of an exemplary embodiment for image suppression and digital-to analog conversion.

FIG. 5 is a flowchart of an exemplary embodiment for image suppression and digital-to-analog conversion that suppresses undesired image spectra. A digital signal is split into two paths such as the paths 24 and 26 of FIG. 3 (step S100). The digital signal in the first path is filtered by a filter such as the filter 28 of FIG. 3 (step S102). In the second path, the signal is compensated by a delay compensator such as the delay compensator 36, to compensate for a delay introduced by the filtering of the signal in the first path (step S104). The signal in each path is converted to a respective analog signal by a respective DAC (step S106). The analog signal in the first path is phase-shifted (step S108). The analog signal outputs of each path are then combined (step S110). The relative phase shifts between the two paths are such that undesired image spectra are cancelled when the signals of the two paths are combined.

Thus, one embodiment is a method for suppressing images in the spectrum of a digital signal and converting the digital signal to an analog signal. In a first signal path, the digital signal is filtered, converted to analog and phase shifted. In a second signal path, the digital signal is delayed an integer number of clock cycles and converted to analog. The output of the first and second signal paths are combined to produce an output signal that has out-of-band image spectra substantially suppressed.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A device for suppression of image spectra of a digital signal and for converting the digital signal to an analog signal, the device comprising:
   a first signal path and a second signal path electrically parallel to the first signal path, the first signal path having:
      a filter;
      a first digital-to-analog converter, DAC;
      an analog phase shifter; and
      a first signal path output; and
   the second signal path having:
      a coarse delay compensation device, the coarse delay compensation device delaying the digital signal to compensate for a group delay response of the filter;
      a second DAC; and
      a second signal path output; and
   a combiner, the combiner combining the first signal path output with the second signal path output, the combining producing a combined signal with replicas of the image spectra being at least partially suppressed.

2. The device of claim 1, wherein the filter is a real tap filter.

3. The device of claim 1, wherein the filter has a symmetric magnitude response and an anti-symmetric phase response.

4. The device of claim 1, wherein the filter is a complex filter, and the first signal path and the second signal path each further include a quadrature modulator.

5. The device of claim 1, wherein the analog phase shifter shifts the phase of the signal in the first signal path to provide a substantially 180 degree phase difference between a replica of the image spectra from the first signal path and a replica of the image spectra from the second signal path.

6. The device of claim 1, wherein the first signal path and the second signal path each receive a same digital input signal comprising a plurality of signals from different channels.

7. The device of claim 6, wherein each one of the plurality of signals is tuned to a different intermediate frequency, IF.

8. The device of claim 1, wherein the coarse delay compensation device is arranged to provide a delay to compensate for a non-causal impulse response of the filter.

9. The device of claim 1, wherein the delay of the coarse delay compensation device is an integer number of clock cycles.

10. The device of claim 1, further comprising a first interpolator in the first signal path to up-sample the signal in the first signal path and a second interpolator in the second signal path to up-sample the signal in the second signal path.

11. A method for suppressing images in the spectrum of a digital signal and converting the digital signal to an analog signal, the method comprising:

in a first signal path:
  filtering the digital signal by a filter;
  converting the filtered digital signal to produce a first analog signal;
  phase-shifting the first analog signal; and
  outputting the phase-shifted analog signal to produce a first signal path output; and
in a second path:
  delaying the digital signal by a coarse delay device;
  converting the delayed digital signal to produce a second analog signal; and
  outputting the second analog signal to produce a second signal path output; and
combining the first signal path output and the second signal path output to produce a combined output signal that has out-of-band image spectra substantially suppressed.

12. The method of claim 11, wherein the filter is a real tap filter.

13. The method of claim 11, wherein the filter exhibits an impulse response that is offset in the time domain.

14. The method of claim 11, wherein the coarse delay device delays the digital signal by an integer number of clock cycles.

15. The method of claim 11, wherein a phase difference between the first signal path output and the second signal path output is substantially 180 degrees over a frequency band of an undesired replica of the image spectra.

16. A system for suppression of image spectra and for conversion of multiple digital signals to an analog signal, the system comprising:
  for each one of a plurality of digital input signals:
    in a first signal path:
      a complex filter;
      a first quadrature modulator; and
      a first signal path output; and
    in a second signal path:
      a coarse delay device;
      a second quadrature modulator; and
      a second signal path output; and
  a first adder, the first adder adding the first signal path outputs to produce a first composite digital signal;
  a second adder, the second adder adding the second signal path outputs to produce a second composite digital signal
  a first digital-to-analog converter (DAC), the first DAC converting the first composite digital signal to a first analog signal;
  a second DAC, the second DAC converting the second composite digital signal to a second analog signal;
  an analog phase shifter communicatively coupled to the second DAC to phase-shift the second analog signal to produce a phase-shifted second analog signal; and
  a third adder, the third adder combining the first analog signal and the phase-shifted second analog signal to produce an output signal having suppressed image spectra.

17. The system of claim 16, further comprising a first interpolator communicatively interposed between the first adder and the first DAC, and a second interpolator communicatively interposed between the second adder and the second DAC.

18. The system of claim 16, wherein the phase-shift of the analog phase shifter provides a phase shift so that a replica of the image spectra of the first analog signal and a replica of the image spectra of the phase-shifted second analog signal are substantially 180 degree out of phase.

19. The system of claim 16, wherein the coarse delay element in each second signal path provides a delay equal to an integer number of clock cycles.

20. The system of claim 16, wherein the combination of the complex filter and the first quadrature modulator in each first signal path provides a symmetric magnitude response and an anti-symmetric phase response.

* * * * *

UNITED STATES PATENT AND TRADEMARK OFFICE
CERTIFICATE OF CORRECTION

PATENT NO. : 8,520,968 B1  
APPLICATION NO. : 13/403718  
DATED : August 27, 2013  
INVENTOR(S) : Wyville Page 1 of 1

It is certified that error appears in the above-identified patent and that said Letters Patent is hereby corrected as shown below:

In the Drawings

In Fig. 5, Sheet 5 of 5, in step S110, in Line 1, delete "ANALOGS" and insert -- ANALOG --, therefor.

In the Claims

Column 8, Lines 4-5, in Claim 16, delete "signal" and insert -- signal; --, therefor.

Signed and Sealed this  
Fifteenth Day of July, 2014

Michelle K. Lee  
*Deputy Director of the United States Patent and Trademark Office*